United States Patent
Fu et al.

(10) Patent No.: US 12,439,329 B2
(45) Date of Patent: Oct. 7, 2025

(54) HANDOVER METHOD AND DEVICE

(71) Applicant: GUANGDONG OPPO MOBILE TELECOMMUNICATIONS CORP., LTD., Dongguan (CN)

(72) Inventors: Zhe Fu, Dongguan (CN); Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 424 days.

(21) Appl. No.: 17/985,618

(22) Filed: Nov. 11, 2022

(65) Prior Publication Data

US 2023/0073616 A1   Mar. 9, 2023

Related U.S. Application Data

(63) Continuation of application No. PCT/CN2020/090370, filed on May 14, 2020.

(51) Int. Cl.
*H04W 48/18* (2009.01)
*H04W 36/00* (2009.01)

(52) U.S. Cl.
CPC ........ *H04W 48/18* (2013.01); *H04W 36/0011* (2013.01); *H04W 36/0064* (2023.05)

(58) Field of Classification Search
CPC .................................................. H04W 48/04
See application file for complete search history.

(56) References Cited

U.S. PATENT DOCUMENTS

| | | | |
|---|---|---|---|
| 2019/0306761 A1* | 10/2019 | Jin | H04W 76/11 |
| 2019/0313304 A1* | 10/2019 | Belling | H04W 36/24 |
| 2020/0022033 A1* | 1/2020 | Wei | H04W 36/0064 |
| 2020/0022061 A1 | 1/2020 | Jin et al. | |

(Continued)

FOREIGN PATENT DOCUMENTS

| | | |
|---|---|---|
| CN | 107708109 A | 2/2018 |
| CN | 108696905 A | 10/2018 |
| CN | 109041138 A | 12/2018 |

(Continued)

OTHER PUBLICATIONS

Extended European Search Report dated May 10, 2023 received in European Patent Application No. EP20935531.2.

(Continued)

*Primary Examiner* — Luna Weissberger
(74) *Attorney, Agent, or Firm* — Sheppard, Mullin, Richter & Hampton LLP

(57) ABSTRACT

The embodiments of the present disclosure provide a handover method and device, capable of taking information on a slice requested to be handed over and/or information on a slice supported by a target network element into account in a handover process, thereby avoiding impact of introduction of network slicing on cell handover. The handover method includes: determining, by a first device, a handover behavior based on target slice information. The target slice information includes information on a slice requested to be handed over and/or information on a slice supported by a target network element. The handover behavior includes: whether to perform handover and/or whether to perform slice remapping or slice fallback during a handover process.

20 Claims, 3 Drawing Sheets

(56) References Cited

U.S. PATENT DOCUMENTS

2022/0078680 A1\* 3/2022 Wu .................. H04W 36/0064

FOREIGN PATENT DOCUMENTS

| CN | 109819488 A | 5/2019 | | |
|---|---|---|---|---|
| CN | 111149387 A | 5/2020 | | |
| EP | 3537760 A1 | 9/2019 | | |
| WO | 2019137471 A1 | 7/2019 | | |
| WO | WO-2021056449 A1 \* | 4/2021 | ............ | H04W 36/13 |
| WO | WO-2021212515 A1 \* | 10/2021 | ........ | H04W 36/0055 |

OTHER PUBLICATIONS

Huawei et al:"Discussion on new SID for network slicing security"3GPP Draft; S3-201152, 3rd Generation Partnership Project (3GPP), Mobile Competencecentre 650, Route Deslucioles ; F-06921 Sophia-Antipolis Cedex ; France ; vol. SA WG3, No. Online Meeting ;May 11, 2020-202005151 (May 1, 2020), XP051879791.
International Search Report and Written Opinion dated Feb. 18, 2021 in International Application No. PCT/CN2020/090370. English translation attached.

\* cited by examiner

HANDOVER METHOD AND DEVICE

CROSS-REFERENCE TO RELATED APPLICATIONS

The present application is a continuation of International Application No. PCT/CN2020/090370, filed on May 14, 2020, the entire disclosure of which is incorporated herein by reference.

TECHNICAL FIELD

The embodiments of the present disclosure relate to communication technology, and more particularly, to a handover method and device.

BACKGROUND

In New Radio (NR) system, network slicing is introduced. Based on network slicing, it is possible to provide lower latency, improved customization, greater flexibility and higher extensibility for services with different requirements. However, the introduction of network slicing will have impact on cell handover (HO).

SUMMARY

The embodiments of the present disclosure provide a handover method and device, capable of taking information on a slice requested to be handed over and/or information on a slice supported by a target network element into account in a handover process, thereby avoiding impact of introduction of network slicing on cell handover.

In a first aspect, a handover method is provided. The method includes: determining, by a first device, a handover behavior based on target slice information. The target slice information includes information on a slice requested to be handed over and/or information on a slice supported by a target network element. The handover behavior includes: whether to perform handover and/or whether to perform slice remapping or slice fallback during a handover process.

In a second aspect, a handover device is provided. The handover device is configured to perform the method according to the above first aspect or any implementation thereof.

In particular, the handover device includes one or more functional modules configured to perform the method according to the above first aspect.

In a third aspect, a handover device is provided. The handover device includes a processor and a memory. The memory is configured to store a computer program, and the processor is configured to invoke and execute the computer program stored in the memory to perform the method according to the above first aspect.

In a fourth aspect, an apparatus is provided. The apparatus is configured to perform the method according to the above first aspect or any implementation thereof.

In particular, the apparatus includes a processor configured to invoke and execute a computer program from a memory, to enable a device provided with the apparatus to perform the method according to the above first aspect or any implementation thereof.

In a fifth aspect, a computer-readable storage medium is provided. The computer-readable storage medium is configured to store a computer program that enables a computer to perform the method according to the above first aspect or any implementation thereof.

In a sixth aspect, a computer program product is provided. The computer program product includes computer program instructions that cause a computer to perform the method according to the above first aspect or any implementation thereof.

In a seventh aspect, a computer program is provided. The computer program, when executed on a computer, causes the computer to perform the method according to the above first aspect or any implementation thereof.

With the above technical solutions, the first device determines whether to perform handover and/or whether to perform slice remapping or slice fallback during a handover process based on information on a slice requested to be handed over and/or information on a slice supported by a target network element. That is, the present disclosure takes the information on the slice requested to be handed over and/or the information on the slice supported by the target network element into account in the handover process, thereby avoiding impact of introduction of network slicing on cell handover.

DESCRIPTION OF EMBODIMENTS

Figure 1:
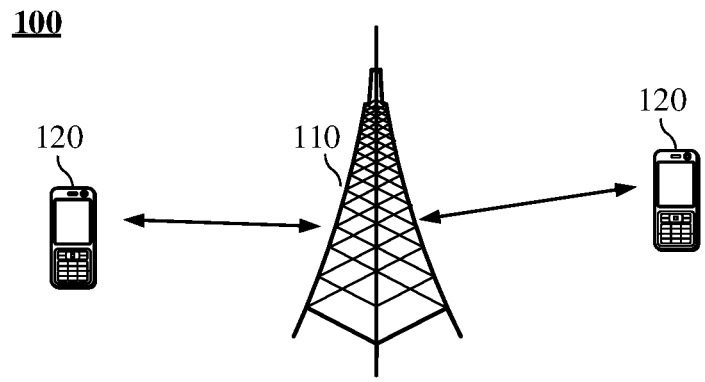
FIG. 1 is a schematic diagram showing a communication system architecture according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5$^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a mobile platform, a remote station, a remote terminal, a mobile device, a user terminal, a terminal, a wireless communication device, a user agent, or a user device, and the like.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110, which may be a device that communicates with a terminal device 120 (or referred to as a communication terminal or terminal). The network device 110 may provide communication coverage for a particular geographic area, and may communicate with terminal devices located within the coverage.

FIG. 1 exemplarily shows one network device and two terminal devices. Alternatively, the communication system may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal devices 120 with a communication function. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

It should be noted that the strong demand for wireless communications in vertical industries is obvious to all. In order to meet the needs of the vertical industries in terms of delay, mobility, reliability, location accuracy, etc., the Radio Access Network (RAN) needs to be enhanced regarding how to support the vertical services in the access network. One way is to provide lower latency, improved customization, greater flexibility and higher extensibility for services with different requirements based on network slicing. More specifically, network slicing enables application providers to participate in customized design, deployment, and operation of the RAN to better support the application provider's services.

The slicing in Release 15 (Rel-15) only involves the core network. Specifically, a terminal device reports a slicing requirement, and a network device selects an appropriate AMF entity according to the slicing requirement reported by the terminal device, so as to establish a service session between the terminal device and the network device.

For a slice identifier, the RAN can define Single-Network Slice Selection Assistance Information (S-NSSAI) for each slice. The terminal device maintains Network Slice Selection Assistance Information (NSSAI), which is an S-NSSAI list, and the terminal device supports up to 8 S-NSSAIs. An S-NSSAI consists of a Slice/Service Type (SST) and a Slice Differentiator (SD). The SST represents a service type and the SD represents different terminal groups served with the same SST.

The Release 17 (Rel-17) introduces enhancements to slicing by the access network, such as network-controlled, slice-based cell reselection and slice-based Random Access Channel (RACH) configuration or access restriction. In addition, for inter-Radio Access Technology (RAT) handover service interruption, for example, when a target base station does not support continuous slicing, slice remapping, fallback, and data forwarding procedures of the terminal device, coordination with Standalone 2 (SA2) will be required.

In addition, the Rel-17 SA2 will further enhance slicing, and introduce a limit on the maximum number of slices supported to ensure the performance of slice transmission.

It should be noted that the handover can be achieved with the following Steps 1 to 3.

Step 1: Handover Preparation. A source base station configures the terminal device to perform measurement reporting and transmits a handover request to a target base station based on the result reported by the terminal device. In the handover request message, information related to a Protocol Data Unit (PDU) session is carried. The PDU session related information includes slice information and Quality of Service (QoS) profile information at the QoS data flow level, such as 5G QoS Indicator (5QI) and corresponding QoS parameters. The target side performs admission control. When the target base station corresponding to the PDU session in the handover request does not support slicing, the target base station will reject the PDU session. After the target base station agrees to the handover request, it will configure a Radio Resource Control (RRC) message for the terminal device, such as mobilityControlInformation, which include a resource for RACH, a Cell Radio Network Temporary Identity (C-RNTI), a security algorithm of the target base station, and a system message of the target base station, etc.

Step 2: Handover Execution. The source base station forwards mobilityControlInformation to the terminal device, and after receiving a handover command, the terminal device initiates a random access procedure to the target base station. At the same time, the source base station will transmit a Sequence Number (SN) STATUS TRANSFER to the target base station, informing the target base station of an uplink Packet Data Convergence Protocol (PDCP) SN reception status and a downlink PDCP SN transmission status.

Step 3: Handover Completion. When the terminal device successfully accesses the target base station (random access is successful), the target base station will transmit a PATH SWITCH REQUEST, requesting a mobility management entity to switch a downlink path, and after the path switch is completed, the target base station will instruct the source base station to release context information of the terminal device, and the handover is completed.

However, the Rel-17 SA2 introduces a new slice parameter, such as a maximum number of slices supported, to guarantee slice requirements. After the slicing parameter is introduced, it may affect the RAN technology, such as handover.

Based on the above technical problems, the present disclosure provides a handover scheme, which fully considers the impact of slice parameter on handover decision.

The technical solutions of the present disclosure will be described in detail below with reference to specific embodiments.

Figure 2:
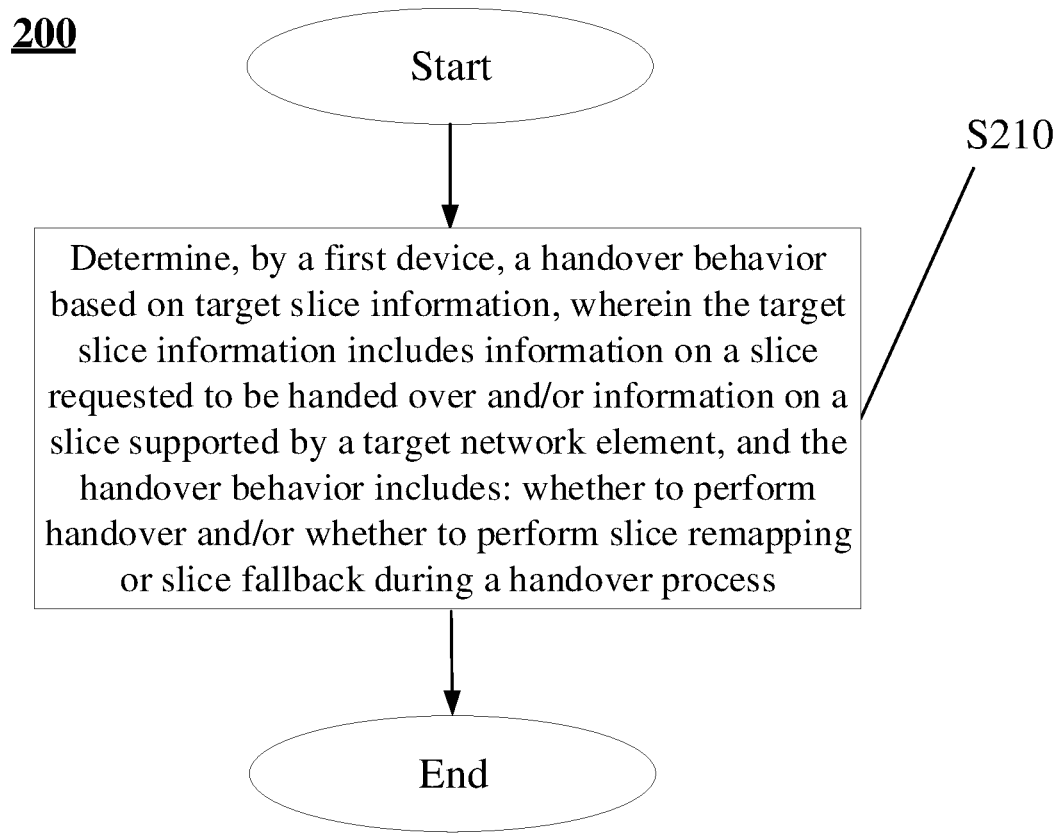
FIG. 2 is a schematic flowchart illustrating a handover method according to an embodiment of the present disclosure.

FIG. 2 is a schematic flowchart illustrating a handover method 200 according to an embodiment of the present disclosure. As shown in FIG. 2, the method 200 may include, but not limited to, the following contents.

At S210, a first device determines a handover behavior based on target slice information.

The target slice information includes information on a slice requested to be handed over and/or information on a slice supported by a target network element.

The handover behavior includes: whether to perform handover and/or whether to perform slice remapping or slice fallback during a handover process.

In an embodiment of the present disclosure, whether to perform handover may refer to whether the terminal device is to be handed over from a source base station to a target base station, or whether the terminal device is to be handed over from a source cell to a target cell.

Optionally, the first device includes, but not limited to, one of the following:

a target base station, a target Access and Mobility Management Function (AMF) entity, a Session Management Function (SMF) entity, a User Plane Function (UPF) entity, or a specific network element for determining a slice admission status.

Optionally, in some scenarios, the first device may be a target SMF entity, or the first device may be a target UPF entity.

Optionally, in an embodiment of the present disclosure, when the first device is a target base station, the target network element may be a target base station; when the first device is a target AMF entity, the target network element may be a target base station or a target AMF entity; or when the first device is an SMF entity or a UPF entity or a specific network element for determining a slice admission status, the target network element may be a target base station or a target AMF entity.

It should be noted that, in an embodiment of the present disclosure, the target slice information may be information configured by an Operation Administration and Maintenance (OAM) entity and stored in an AMF entity. Alternatively, the target slice information may be notified by the base station to the AMF entity.

Optionally, in an embodiment of the present disclosure, the information on the slice requested to be handed over may include, but not limited to, at least one of:

an identifier of a PDU session requested to be handed over, an identifier of a slice requested to be handed over, a priority of the PDU session requested to be handed over, a priority of the slice requested to be handed over, a continuity requirement of the PDU session requested to be handed over, a continuity requirement of the slice requested to be handed over.

It should be noted that, in an embodiment of the present disclosure, the slice may be replaced with a service, or the slice may be replaced with a service corresponding to the handover.

Optionally, in an embodiment of the present disclosure, the slice information supported by the target network element may include, but not limited to, at least one of:

an identifier of a slice supported by the target network element, a maximum number of users supported by at least one slice, a maximum number of PDU sessions supported by at least one slice, a maximum uplink/downlink data rate for each user on at least one slice, a slicing capability supported by the target network element, whether the target network element supports slicing, and whether the target network element supports slice modification.

It should be noted that, in some scenarios, the slicing capability supported by the target network element may include at least one of: whether the target network element supports slicing and whether the target network element supports slice modification.

In addition, whether the target network element supports slice modification may include: whether the target network element supports slice remapping and/or slice fallback.

Optionally, in some embodiments, the first device may acquire at least one of the maximum number of users supported by the at least one slice, the maximum number of PDU sessions supported by the at least one slice, and the maximum uplink/downlink data rate for each user on the at least one slice, from at least one of an OAM entity, a network slice management entity, a core network entity, and an access network entity.

Optionally, the network slice management entity may be a Network Slice Function (NSF) entity.

Optionally, the core network entity may include, but not limited to, at least one of:

an NSF entity, an AMF entity, an SMF entity, or a UPF entity.

Optionally, the access network entity may be a base station.

Optionally, the target base station may store slice parameters for other base stations, including for example the maximum number of users supported by at least one slice, the maximum number of PDU sessions supported by at least one slice, and the maximum uplink/downlink data rate for each user on at least one slice, etc.

Optionally, in some embodiments, the above step S210 may specifically include:

determining, by the first device, not to perform handover when at least one of the following is satisfied: the target network element does not support slicing, the target network element does not support slice remapping, and the target network element does not support slice fallback.

Optionally, in some embodiments, the above step S210 may specifically include at least one of:

determining, by the first device, not to perform handover when the slice supported by the target network element does not match the PDU session or slice requested to be handed over;

determining, by the first device, to perform handover and to perform slice remapping or slice fallback during the handover process when the slice supported by the target network element does not match the PDU session or slice requested to be handed over and the priority of the PDU session or slice requested to be handed over is higher than a predetermined value;

determining, by the first device, to perform handover and to perform slice remapping or slice fallback during the handover process when the slice supported by the target network element does not match the PDU session or slice requested to be handed over and the PDU session or slice requested to be handed over has the continuity requirement;

determining, by the first device, to perform handover and to perform slice remapping or slice fallback during the handover process when the slice supported by the target network element does not match the PDU session or slice requested to be handed over, the priority of the PDU session or slice requested to be handed over is higher than a predetermined value, and the target network element supports slice modification;

determining, by the first device, to perform handover and to perform slice remapping or slice fallback during the handover process when the slice supported by the target network element does not match the PDU session or slice requested to be handed over, the PDU session or slice requested to be handed over has the continuity requirement, and the target network element supports slice modification;

determining, by the first device, to perform handover and to perform slice remapping or slice fallback during the handover process when the slice supported by the target network element does not match the PDU session or slice requested to be handed over, the PDU session or slice requested to be handed over has the continuity requirement, and the target network element supports or has established a default PDU session;

determining, by the first device, not to perform handover when the slice supported by the target network element does not match the PDU session or slice requested to be handed over, the priority of the PDU session or slice requested to be handed over is higher than a predetermined value, and the target network element does not support slice modification; and determining, by the first device, not to perform handover when the slice supported by the target network element does not match the PDU session or slice requested to be handed over, the PDU session or slice requested to be handed over has the continuity requirement, and the target network element does not support slice modification.

Optionally, in some embodiments, the above step S210 may specifically include at least one of:

determining, by the first device, to perform handover when the slice supported by the target network element matches the PDU session or slice requested to be handed over;

determining, by the first device, not to perform handover when the PDU session or slice requested to be handed over matches a first slice supported by the target network element, and a number of users of the target network element on the first slice has reached a maximum number of users supported by the first slice;

determining, by the first device, to perform handover and to perform slice remapping or slice fallback during the handover process when the PDU session or slice requested to be switched matches a first slice supported by the target network element, a number of users of the target network element on the first slice has reached a maximum number of users supported by the first slice, and the target network element supports slice modification;

determining, by the first device, to perform handover and to perform slice remapping or slice fallback during the handover process when the PDU session or slice requested to be switched matches a first slice supported by the target network element, a number of users of the target network element on the first slice has reached a maximum number of users supported by the first slice, and the target network element supports or has established a default PDU session;

determining, by the first device, to perform handover when the PDU session or slice requested to be handed over matches a first slice supported by the target network element, and a number of users of the target network element on the first slice has not reached a maximum number of users supported by the first slice;

determining, by the first device, not to perform handover when the PDU session or slice requested to be handed over matches a first slice supported by the target network element, and a number of PDU sessions of the target network element on the first slice has reached a maximum number of PDU sessions supported by the first slice;

determining, by the first device, to perform handover and to perform slice remapping or slice fallback during the handover process when the PDU session or slice requested to be handed over matches a first slice supported by the target network element, a number of PDU sessions of the target network element on the first slice has reached a maximum number of PDU sessions supported by the first slice, and the target network element supports slice modification;

determining, by the first device, to perform handover and to perform slice remapping or slice fallback during the handover process when the PDU session or slice requested to be handed over matches a first slice supported by the target network element, a number of PDU sessions of the target network element on the first slice has reached a maximum number of PDU sessions supported by the first slice, and the target network element supports or has established a default PDU session;

determining, by the first device, to perform handover when the PDU session or slice requested to be handed over matches a first slice supported by the target network element, and a number of PDU sessions of the target network element on the first slice has not reached a maximum number of PDU sessions supported by the first slice;

determining, by the first device, not to perform handover when the PDU session or slice requested to be handed over matches a first slice supported by the target network element, and an uplink/downlink data rate for each user of the target network element on the first slice has reached a maximum uplink/downlink data rate for each user on the first slice or would reach the maximum uplink/downlink data rate for each user on the first slice once the terminal device is admitted;

determining, by the first device, to perform handover and to perform slice remapping or slice fallback during the handover process when the PDU session or slice requested to be handed over matches a first slice supported by the target network element, an uplink/downlink data rate for each user of the target network element on the first slice has reached a maximum uplink/downlink data rate for each user on the first slice or would reach maximum uplink/downlink data rate for each user on the first slice once the terminal device is admitted, and the target network element supports slice modification; and determining, by the first device, to perform handover when the PDU session or slice requested to be handed over matches a first slice supported by the target network element, an uplink/downlink data rate for each user of the target network element on the first slice has not reached a maximum uplink/downlink data rate for each user on the first slice or would not reach maximum uplink/downlink data rate for each user on the first slice once the terminal device is admitted.

Optionally, in some embodiments, the above step S210 may specifically include at least one of:

determining, by the first device, not to perform handover when the PDU session or slice requested to be handed over matches a plurality of slices supported by the target network element, and a number of users of the target network element on at least one of the plurality of slices reaches a maximum number of users supported by the at least one slice;

determining, by the first device, to perform handover when the PDU session or slice requested to be handed over matches a plurality of slices supported by the target network element, and a number of users of the target network element on each of the plurality of slices has not reached a maximum number of users supported by the slice;

determining, by the first device, to perform handover when the PDU session or slice requested to be handed over matches a plurality of slices supported by the target network element, and a number of users of the target network element on at least one of the plurality of slices has not reached a maximum number of users supported by the at lease on slice;

determining, by the first device, not to perform handover when the PDU session or slice requested to be handed over matches a plurality of slices supported by the target network element, and a number of PDU sessions of the target network element on at least one of the plurality of slices has reached a maximum number of PDU sessions supported by the at least one slice;

determining, by the first device, to perform handover when the PDU session or slice requested to be handed over matches a plurality of slices supported by the target network element, and a number of PDU sessions of the target network element on each of the plurality of slices has not reached a maximum number of PDU sessions supported by the slice;

determining, by the first device, to perform handover when the PDU session or slice requested to be handed over matches a plurality of slices supported by the target network element, and a number of PDU sessions of the target network element on at least one of the plurality of slices has not reached a maximum number of PDU sessions supported by the at least one slice;

determining, by the first device, not to perform handover when the PDU session or slice requested to be handed over matches a plurality of slices supported by the target network element, and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted;

determining, by the first device, to perform handover when the PDU session or slice requested to be switched matches a plurality of slices supported by the target network element, and an uplink/downlink data rate for each user of the target network element on each of the plurality of slices has not reached a maximum uplink/downlink data rate for each user on the slice or would not reach the maximum uplink/downlink data rate for each user on the slice once the terminal device is admitted; and determining, by the first device, to perform handover when the PDU session or slice requested to be switched matches a plurality of slices supported by the target network element, and an uplink/downlink data rate for each user of the target network element on at least one of the plurality of slices has not reached a maximum uplink/downlink data rate for each user on the at least one slice or would not reach the maximum uplink/downlink data rate for each user on the at least one slice once the terminal device is admitted.

Optionally, in some embodiments, the above step S210 may specifically include at least one of:

determining, by the first device when the PDU session or slice requested to be handed over matches a plurality of slices supported by the target network element and a number of users of the target network element on at least one of the plurality of slices has reached a maximum number of users supported by the at least one slice, to perform handover and determining that the at least one slice is rejected or determining to perform slice remapping or slice fallback during the handover process;

determining, by the first device when the PDU session or slice requested to be handed over matches a plurality of slices supported by the target network element and a number of PDU sessions of the target network element on at least one of the plurality of slices has reached a maximum number of PDU sessions supported by the at least one slice, to perform handover and determining that the at least one slice is rejected or determining to perform slice remapping or slice fallback during the handover process;

determining, by the first device when the PDU session or slice requested to be handed over matches a plurality of slices supported by the target network element and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, to perform handover and determining that the at least one slice is rejected or determining to perform slice remapping or slice fallback during the handover process;

determining, by the first device when the PDU session or slice requested to be handed over matches a plurality of slices supported by the target network element, a number of users of the target network element on at least one of the plurality of slices has reached a maximum number of users supported by the at least one slice, and the target network element supports slice modification, to perform handover and determining that the at least one slice is rejected or determining to perform slice remapping or slice fallback during the handover process;

determining, by the first device when the PDU session or slice requested to be handed over matches a plurality of slices supported by the target network element, a number of users of the target network element on at least one of the plurality of slices has reached a maximum number of users supported by the at least one slice, and the target network element supports or has established a default PDU session, to perform handover and determining that the at least one slice is rejected or determining to perform slice remapping or slice fallback during the handover process;

determining, by the first device when the PDU session or slice requested to be handed over matches a plurality of slices supported by the target network element, a number of PDU sessions of the target network element on at least one of the plurality of slices has reached a maximum number of PDU sessions supported by the at least one slice, and the target network element supports slice modification, to perform handover and determining that the at least one slice is rejected or determining to perform slice remapping or slice fallback during the handover process;

determining, by the first device when the PDU session or slice requested to be handed over matches a plurality of slices supported by the target network element, a number of PDU sessions of the target network element on at least one of the plurality of slices has reached a maximum number of PDU sessions supported by the at least one slice, and the target network element supports or has established a default PDU session, to perform handover and determining that the at least one slice is rejected or determining to perform slice remapping or slice fallback during the handover process;

determining, by the first device when the PDU session or slice requested to be handed over matches a plurality of slices supported by the target network element, an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, and the target network element supports slice modification, to perform handover and determining that the at least one slice is rejected or determining to perform slice remapping or slice fallback during the handover process; and determining, by the first device when the PDU session or slice requested to be handed over matches a plurality of slices supported by the target network element, an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, and the target network element supports or has established a default PDU session, to perform handover and determining that the at least one slice is rejected or determining to perform slice remapping or slice fallback during the handover process.

Optionally, in some embodiments, the first device may recommend to the second device: a selectable handover cell or base station, slice information supported by the first device, a cell/base station supporting a slice requested by the first device and/or supported slice information, or a correspondence between slices and cells/base stations stored at the first device.

For example, when the first device determines not to perform handover, the first device may recommend to the second device: a selectable handover cell or base station, slice information supported by the first device, a cell/base station supporting a slice requested by the first device and/or supported slice information, or a correspondence between slices and cells/base stations stored at the first device.

In another example, when the first device determines that it does not support slicing, does not support the requested slice, or does not support the requested PDU session, the first device may recommend to the second device: a selectable handover cell or base station, slice information supported by the first device, a cell/base station supporting a slice requested by the first device and/or supported slice information, or a correspondence between slices and cells/base stations stored at the first device.

In another example, when the first device determines not to perform handover and the priority of the PDU session or slice requested to be handed over is higher than a predetermined value, the first device may recommend to the second device: a selectable handover cell or base station, slice information supported by the first device, a cell/base station supporting a slice requested by the first device and/or supported slice information, or a correspondence between slices and cells/base stations stored at the first device.

In another example, when the first device determines not to perform handover and the PDU session or slice requested to be handed over has the continuity requirement, the first device may recommend to the second device: a selectable handover cell or base station, slice information supported by the first device, a cell/base station supporting a slice requested by the first device and/or supported slice information, or a correspondence between slices and cells/base stations stored at the first device.

In another example, when the first device determines that it does not support slicing, does not support the requested slice, does not support the requested PDU session, does not support slice modification, or does not support PDU session modification corresponding to the slice, and the priority of the PDU session or slice requested to be handed over is higher than a predetermined value, the first device may recommend to the second device: a selectable handover cell or base station, slice information supported by the first device, a cell/base station supporting a slice requested by the first device and/or supported slice information, or a correspondence between slices and cells/base stations stored at the first device.

In another example, when the first device determines that it does not support slicing, does not support the requested slice, does not support the requested PDU session, does not support slice modification, or does not support PDU session modification corresponding to the slice, and the PDU session or slice requested to be handed over has the continuity requirement, the first device may recommend to the second device: a selectable handover cell or base station, slice information supported by the first device, a cell/base station supporting a slice requested by the first device and/or supported slice information, or a correspondence between slices and cells/base stations stored at the first device.

Optionally, the second device may be one of:
a source base station, a source AMF entity, an SMF entity, a UPF entity, a terminal device, and a specific network element for determining a slice admission status.

Optionally, in some scenarios, the second device may be a source SMF entity, or the second device may be a source UPF entity.

The handover scheme in the present disclosure will be described in detail below with reference to specific Embodiment 1 and Embodiment 2.

Embodiment 1

Based on the target slice information, the first device determines the handover behavior. The handover behavior includes: whether to perform handover and/or whether to perform slice remapping or slice fallback during a handover process. The first device may be a target base station, such as a gNB or a Next Generation Evolutional NodeB (NG-eNB).

Applicable scenarios of Embodiment 1: handover between gNB and gNB, handover between NG-eNB and gNB, and handover between NG-eNB and NG-eNB.

Specifically, in Embodiment 1, Xn handover is taken as an example and the first device is the target base station as an example.

Figure 3:
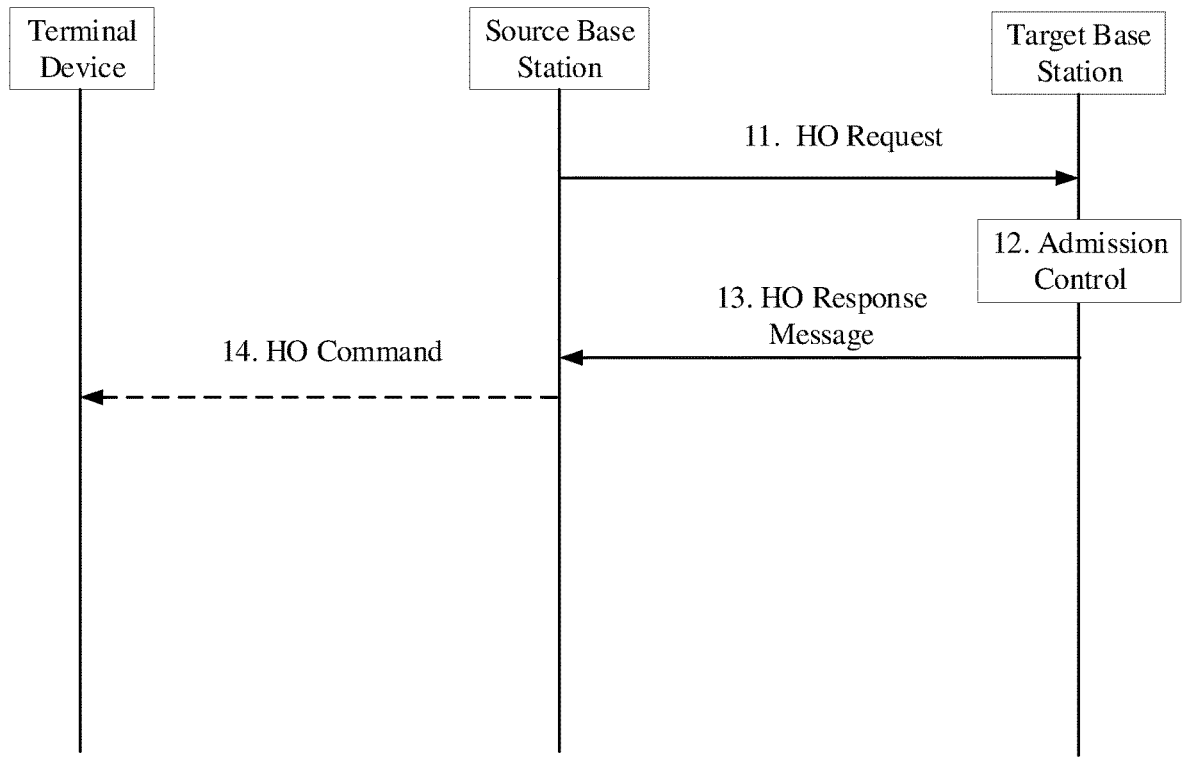
FIG. 3 is a schematic flowchart illustrating a handover according to an embodiment of the present disclosure.

Embodiment 1 specifically includes the following steps 11 to 14, as shown in FIG. 3.

The source base station transmits a handover request to the target base station.

After the target base station receives the handover request from the source base station, the target base station performs admission control.

Specifically, the target base station determines the handover behavior based on the target slice information, and the handover behavior includes: whether to perform handover and/or whether to perform slice remapping or slice fallback during a handover process.

Optionally, the target slice information may be as described in the above method 200.

Optionally, the target base station determines the handover behavior based on the target slice information, which may be specifically described in the above step S210.

Optionally, in some scenarios, the target base station may recommend a selectable handover cell or base station to the source base station, such that the source base station can select a candidate handover target cell. Alternatively, the target base station may recommend to the source base station: slice information supported by the target base station, or a cell/base station supporting a slice requested by the target base station and/or supported slice information, or a correspondence between slices and cells/base stations stored at the target base station.

For example, when the target base station determines not to perform handover, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

In another example, when the target base station determines that it does not support slicing, does not support the requested slice, or does not support the requested PDU session, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

In another example, when the target base station determines not to perform handover, and the priority of the PDU session or slice requested to be handed over is higher than a predetermined value, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

In another example, when the target base station determines not to perform handover, and the PDU session or slice requested to be handed over has the continuity requirement, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

In another example, when the target base station determines that it does not support slicing, does not support the requested slice, does not support the requested PDU session, does not support slice modification, or does not support PDU session modification corresponding to the slice, and the priority of the PDU session or slice requested to be handed over is higher than a predetermined value, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

In another example, the target base station determines that it does not support slicing, does not support the requested slice, does not support the requested PDU session, does not support slice modification, or does not support PDU session modification corresponding to the slice, and the PDU session or slice requested to be handed over has the continuity requirement, the target base station may recommend to the source base station: a selectable handover cell or base station, slice information supported by the target base station, or a cell/base stations supporting a slice requested by the target base station and/or supported slice information, or a correspondence between slices and cells/base stations stored at the target base station.

The target base station transmits a handover response message, e.g., handover request acknowledgement (ACK) or handover preparation failure, to the source base station. If the handover is not supported, the source base station may further determine a candidate handover cell based on the selectable handover cell or base station as recommended by the target base station. Alternatively, the target base station can provide the source base station with the slice information supported by the base station, or provide the cell/base station the of the base station that supports the requested slice, or provide a correspondence between slices and the cells/base stations as stored at the base station.

If the handover request ACK is received, the source base station transmits a handover command (HO command) to the terminal device.

In Embodiment 1, a scheme is given where the target base station makes the handover decision based on the parameters introduced by SA2 and performs handover. The HO behavior is clarified to ensure slice service transmission.

Embodiment 2

Based on the target slice information, the first device determines the handover behavior. The handover behavior includes: whether to perform handover and/or whether to perform slice remapping or slice fallback during a handover process. The first device may be a core network entity, such as an AMF entity, an SMF entity, or a specific network element for determining a slice admission status.

Applicable scenarios of Embodiment 2: handover between gNB and gNB, handover between NG-eNB and gNB, and handover between NG-eNB and NG-eNB. Alternatively, in the handover process involving slicing, only the source base station is allowed to trigger N2 handover.

Specifically, in Embodiment 2, an N2 handover is taken as an example, and the first device is an AMF entity. In addition, the first device may alternatively be an SMF entity, or a specific network element for determining a slice admission status, or at least two of an AMF entity, an SMF entity and a target base station jointly.

Figure 4:
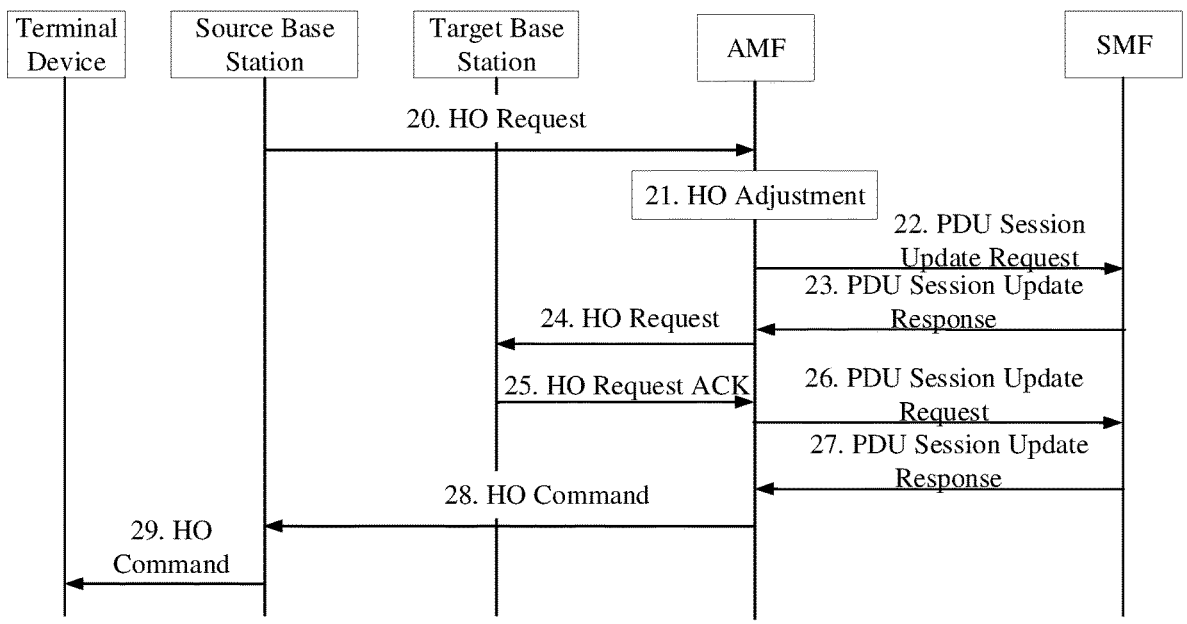
FIG. 4 is a schematic flowchart illustrating another handover according to an embodiment of the present disclosure.

Embodiment 2 specifically includes the following steps 20 to 29, as shown in FIG. 4.

The source base station transmits a handover request to the AMF entity. The AMF entity may be a source AMF entity or a target AMF entity.

The AMF entity determines the handover behavior based on the target slice information, and the handover behavior includes: whether to perform handover and/or whether to perform slice remapping or slice fallback during a handover process.

Optionally, the target slice information may be as described in the above method 200.

Optionally, the target base station determines the handover behavior based on the target slice information, which may be specifically described in the above step S210.

Optionally, in some scenarios, the AMF entity may recommend a selectable handover cell or base station to the source AMF entity or the source base station, such that the source base station or the source AMF entity can select a candidate handover target cell. Alternatively, the AMF entity may provide the source AMF entity or the source base station with slice information supported by the AMF entity, or provide a cell/base station supporting a slice requested by the AMF entity and/or supported slice information, or provide a correspondence between slices and cells/base stations stored at the AMF entity.

For example, when the AMF entity determines not to perform handover, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

In another example, when the AMF entity determines that it does not support slicing, does not support the requested slice, or does not support the requested PDU session, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

In another example, when the AMF entity determines not to perform handover, and the priority of the PDU session or slice requested to be handed over is higher than a predetermined value, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

In another example, when the AMF entity determines not to perform handover, and the PDU session or slice requested to be handed over has the continuity requirement, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

In another example, when the AMF entity determines that it does not support slicing, does not support the requested slice, does not support the requested PDU session, does not support slice modification, or does not support PDU session modification corresponding to the slice, and the priority of the PDU session or slice requested to be handed over is higher than a predetermined value, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

In another example, when the AMF entity determines that it does not support slicing, does not support the requested slice, does not support the requested PDU session, does not support slice modification, or does not support PDU session modification corresponding to the slice, and the PDU session or slice requested to be handed over has the continuity requirement, the AMF entity may recommend to the source AMF entity or the source base station: a selectable handover cell or base station, slice information supported by the AMF entity, a cell/base station supporting a slice requested by the AMF entity and/or supported slice information, or a correspondence between slices and cells/base stations stored at the AMF entity.

The AMF entity transmits a PDU session update request (Nsmf_PDUSession_UpdateSMContext Request) to the SMF entity.

The SMF entity transmits a PDU session update response (Nsmf_PDUSession_UpdateSMContext Response) to the AMF entity.

The AMF entity transmits a handover request message to the target base station.

The target base station transmits a Handover Request Acknowledge.

The AMF entity transmits a PDU session update request (Nsmf_PDUSession_UpdateSMContext Request) to the SMF entity, for updating information of SM based on the result of the target base station.

The SMF entity transmits a PDU session update response (Nsmf_PDUSession_UpdateSMContext Response) to the AMF entity.

The AMF entity transmits a handover command to the source base station, including a handover result.

Specifically, if the AMF entity determines not to perform handover, the AMF entity may further notify/recommend a selectable handover cell or base station to the source base station.

Optionally, if the AMF entity determines not to perform handover, the AMF entity may trigger the action of step 28 directly after step 21.

The source base station transmits a handover command to the terminal device.

In Embodiment 2, a scheme is given where in the N2 handover process, according to the parameter information of SA2, it is determined whether and how the handover is to be performed. The HO behavior is clarified to ensure slice service transmission.

The method embodiments of the present disclosure have been described in detail above with reference to FIGS. 2 to 4, and the apparatus embodiments of the present disclosure will be described in detail below with reference to FIGS. 5 to 8. It should be understood that the apparatus embodiments and the method embodiments correspond to each other, and for similar description, reference can be made to the method embodiments.

Figure 5:
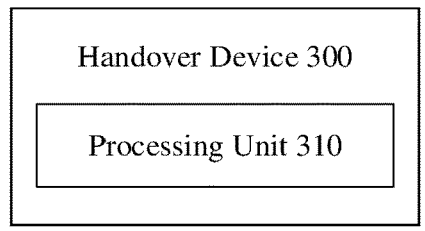
FIG. 5 is a schematic block diagram of a handover device according to an embodiment of the present disclosure.

FIG. 5 shows a schematic block diagram of a handover device 300 according to an embodiment of the present disclosure. As shown in FIG. 5, the device 300 includes:

a processing unit 310 configured to determine a handover behavior based on target slice information.

The target slice information includes information on a slice requested to be handed over and/or information on a slice supported by a target network element.

The handover behavior includes: whether to perform handover and/or whether to perform slice remapping or slice fallback during a handover process.

Optionally, the information on the slice requested to be handed over may include at least one of:

an identifier of a PDU session requested to be handed over, an identifier of a slice requested to be handed over, a priority of the PDU session requested to be handed over, a priority of the slice requested to be handed over, a continuity requirement of the PDU session requested to be handed over, a continuity requirement of the slice requested to be handed over.

Optionally, the information on the slice supported by the target network element may include at least one of:

an identifier of a slice supported by the target network element, a maximum number of users supported by at least one slice, a maximum number of PDU sessions supported by at least one slice, a maximum uplink/downlink data rate for each user on at least one slice, a slicing capability supported by the target network element, whether the target network element supports slicing, and whether the target network element supports slice modification.

Optionally, the processing unit 310 may be further configured to acquire at least one of the maximum number of users supported by the at least one slice, the maximum number of PDU sessions supported by the at least one slice, and the maximum uplink/downlink data rate for each user on the at least one slice, from at least one of an Operation Administration and Maintenance (OAM) entity, a network slice management entity, a core network entity, and an access network entity.

Optionally, the network slice management entity may be an NSF entity.

Optionally, the core network entity may include at least one of:

an NSF entity, an Access and Mobility Management Function (AMF) entity, a Session Management Function (SMF) entity, or a User Plane Function (UPF) entity.

Optionally, the access network entity may be a base station.

Optionally, the processing unit 310 being configured to determine the handover behavior based on the target slice information may include the processing unit 310 being configured to:

determine not to perform handover when at least one of the following is satisfied: the target network element does not support slicing, the target network element does not support slice remapping, and the target network element does not support slice fallback.

Optionally, the processing unit 310 being configured to determine the handover behavior based on the target slice information may include the processing unit 310 being configured to perform at least one of:

determining not to perform handover when the slice supported by the target network element does not match the PDU session or slice requested to be handed over;

determining to perform handover and to perform slice remapping or slice fallback during the handover process when the slice supported by the target network element does not match the PDU session or slice requested to be handed over and the priority of the PDU session or slice requested to be handed over is higher than a predetermined value;

determining to perform handover and to perform slice remapping or slice fallback during the handover process when the slice supported by the target network element does not match the PDU session or slice requested to be handed over and the PDU session or slice requested to be handed over has the continuity requirement;

determining to perform handover and to perform slice remapping or slice fallback during the handover process when the slice supported by the target network element does not match the PDU session or slice requested to be handed over, the priority of the PDU session or slice requested to be handed over is higher than a predetermined value, and the target network element supports slice modification;

determining to perform handover and to perform slice remapping or slice fallback during the handover process when the slice supported by the target network element does not match the PDU session or slice requested to be handed over, the PDU session or slice requested to be handed over has the continuity requirement, and the target network element supports slice modification;

determining not to perform handover when the slice supported by the target network element does not match the PDU session or slice requested to be handed over, the priority of the PDU session or slice requested to be handed over is higher than a predetermined value, and the target network element does not support slice modification; and determining not to perform handover when the slice supported by the target network element does not match the PDU session or slice requested to be handed over, the PDU session or slice requested to be handed over has the continuity requirement, and the target network element does not support slice modification.

Optionally, the processing unit 310 being configured to determine the handover behavior based on the target slice information may include the processing unit 310 being configured to perform at least one of:

determining to perform handover when the slice supported by the target network element matches the PDU session or slice requested to be handed over;

determining not to perform handover when the PDU session or slice requested to be handed over matches a first slice supported by the target network element, and a number of users of the target network element on the first slice has reached a maximum number of users supported by the first slice;

determining to perform handover and to perform slice remapping or slice fallback during the handover process when the PDU session or slice requested to be switched matches a first slice supported by the target network element, a number of users of the target network element on the first slice has reached a maximum number of users supported by the first slice, and the target network element supports slice modification;

determining to perform handover when the PDU session or slice requested to be handed over matches a first slice supported by the target network element, and a number of users of the target network element on the first slice has not reached a maximum number of users supported by the first slice;

determining not to perform handover when the PDU session or slice requested to be handed over matches a first slice supported by the target network element, and a number of PDU sessions of the target network element on the first slice has reached a maximum number of PDU sessions supported by the first slice;

determining to perform handover and to perform slice remapping or slice fallback during the handover process when the PDU session or slice requested to be handed over matches a first slice supported by the target network element, a number of PDU sessions of the target network element on the first slice has reached a maximum number of PDU sessions supported by the first slice, and the target network element supports slice modification;

determining to perform handover when the PDU session or slice requested to be handed over matches a first slice supported by the target network element, and a number of PDU sessions of the target network element on the first slice has not reached a maximum number of PDU sessions supported by the first slice;

determining not to perform handover when the PDU session or slice requested to be handed over matches a first slice supported by the target network element, and an uplink/downlink data rate for each user of the target network element on the first slice has reached a maximum uplink/downlink data rate for each user on the first slice or would reach the maximum uplink/downlink data rate for each user on the first slice once the terminal device is admitted;

determining to perform handover and to perform slice remapping or slice fallback during the handover process when the PDU session or slice requested to be handed over matches a first slice supported by the target network element, an uplink/downlink data rate for each user of the target network element on the first slice has reached a maximum uplink/downlink data rate for each user on the first slice or would reach maximum uplink/downlink data rate for each user on the first slice once the terminal device is admitted, and the target network element supports slice modification; and determining to perform handover when the PDU session or slice requested to be handed over matches a first slice supported by the target network element, an uplink/downlink data rate for each user of the target network element on the first slice has not reached a maximum uplink/downlink data rate for each user on the first slice or would not reach maximum uplink/downlink data rate for each user on the first slice once the terminal device is admitted.

Optionally, the processing unit 310 being configured to determine the handover behavior based on the target slice information may include the processing unit 310 being configured to perform at least one of:

determining not to perform handover when the PDU session or slice requested to be handed over matches a plurality of slices supported by the target network element, and a number of users of the target network element on at least one of the plurality of slices reaches a maximum number of users supported by the at least one slice;

determining to perform handover when the PDU session or slice requested to be handed over matches a plurality of slices supported by the target network element, and a number of users of the target network element on each of the plurality of slices has not reached a maximum number of users supported by the slice;

determining to perform handover when the PDU session or slice requested to be handed over matches a plurality of slices supported by the target network element, and a number of users of the target network element on at least one of the plurality of slices has not reached a maximum number of users supported by the at lease on slice;

determining not to perform handover when the PDU session or slice requested to be handed over matches a plurality of slices supported by the target network element, and a number of PDU sessions of the target network element on at least one of the plurality of slices has reached a maximum number of PDU sessions supported by the at least one slice;

determining to perform handover when the PDU session or slice requested to be handed over matches a plurality of slices supported by the target network element, and a number of PDU sessions of the target network element on each of the plurality of slices has not reached a maximum number of PDU sessions supported by the slice;

determining to perform handover when the PDU session or slice requested to be handed over matches a plurality of slices supported by the target network element, and a number of PDU sessions of the target network element on at least one of the plurality of slices has not reached a maximum number of PDU sessions supported by the at least one slice;

determining not to perform handover when the PDU session or slice requested to be handed over matches a plurality of slices supported by the target network element, and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted;

determining to perform handover when the PDU session or slice requested to be switched matches a plurality of slices supported by the target network element, and an uplink/downlink data rate for each user of the target network element on each of the plurality of slices has not reached a maximum uplink/downlink data rate for each user on the slice or would not reach the maximum uplink/downlink data rate for each user on the slice once the terminal device is admitted; and determining to perform handover when the PDU session or slice requested to be switched matches a plurality of slices supported by the target network element, and an uplink/downlink data rate for each user of the target network element on at least one of the plurality of slices has not reached a maximum uplink/downlink data rate for each user on the at least one slice or would not reach the maximum uplink/downlink data rate for each user on the at least one slice once the terminal device is admitted.

Optionally, the processing unit 310 being configured to determine the handover behavior based on the target slice information may include the processing unit 310 being configured to perform at least one of:

determining, when the PDU session or slice requested to be handed over matches a plurality of slices supported by the target network element and a number of users of the target network element on at least one of the plurality of slices has reached a maximum number of users supported by the at least one slice, to perform handover and determining that the at least one slice is rejected or determining to perform slice remapping or slice fallback during the handover process;

determining, when the PDU session or slice requested to be handed over matches a plurality of slices supported by the target network element and a number of PDU sessions of the target network element on at least one of the plurality of slices has reached a maximum number of PDU sessions supported by the at least one slice, to perform handover and determining that the at least one slice is rejected or determining to perform slice remapping or slice fallback during the handover process;

determining, when the PDU session or slice requested to be handed over matches a plurality of slices supported by the target network element and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, to perform handover and determining that the at least one slice is rejected or determining to perform slice remapping or slice fallback during the handover process;

determining, when the PDU session or slice requested to be handed over matches a plurality of slices supported by the target network element, a number of users of the target network element on at least one of the plurality of slices has reached a maximum number of users supported by the at least one slice, and the target network element supports slice modification, to perform handover and determining that the at least one slice is rejected or determining to perform slice remapping or slice fallback during the handover process;

determining, when the PDU session or slice requested to be handed over matches a plurality of slices supported by the target network element, a number of PDU sessions of the target network element on at least one of the plurality of slices has reached a maximum number of PDU sessions supported by the at least one slice, and the target network element supports slice modification, to perform handover and determining that the at least one slice is rejected or determining to perform slice remapping or slice fallback during the handover process; and determining, when the PDU session or slice requested to be handed over matches a plurality of slices supported by the target network element, an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, and the target network element supports slice modification, to perform handover and determining that the at least one slice is rejected or determining to perform slice remapping or slice fallback during the handover process.

Optionally, the processing unit 310 may be further configured to:

recommend, when the first device determines not to perform handover, to a second device: a selectable handover cell or base station, slice information supported by the first device, a cell/base station supporting a slice requested by the first device and/or supported slice information, or a correspondence between slices and cells/base stations stored at the first device; or recommend, when the first device determines that it does not support slicing, does not support the requested slice, or does not support the requested PDU session, to a second device: a selectable handover cell or base station, slice information supported by the first device, a cell/base station supporting a slice requested by the first device and/or supported slice information, or a correspondence between slices and cells/base stations stored at the first device.

Optionally, the processing unit 310 may be further configured to:

recommend, when the first device determines not to perform handover and the priority of the PDU session or slice requested to be handed over is higher than a predetermined value, to a second device: a selectable handover cell or base station, slice information supported by the first device, a cell/base station supporting a slice requested by the first device and/or supported slice information, or a correspondence between slices and cells/base stations stored at the first device;

recommend, when the first device determines not to perform handover and the PDU session or slice requested to be handed over has the continuity requirement, to a second device: a selectable handover cell or base station, slice information supported by the first device, a cell/base station supporting a slice requested by the first device and/or supported slice information, or a correspondence between slices and cells/base stations stored at the first device;

recommend, when the first device determines that it does not support slicing, does not support the requested slice, does not support the requested PDU session, does not support slice modification, or does not support PDU session modification corresponding to the slice, and the priority of the PDU session or slice requested to be handed over is higher than a predetermined value, to a second device: a selectable handover cell or base station, slice information supported by the first device, a cell/base station supporting a slice requested by the first device and/or supported slice information, or a correspondence between slices and cells/base stations stored at the first device; or recommend, when the first device determines that it does not support slicing, does not support the requested slice, does not support the requested PDU session, does not support slice modification, or does not support PDU session modification corresponding to the slice, and the PDU session or slice requested to be handed over has the continuity requirement, to a second device: a selectable handover cell or base station, slice information supported by the first device, a cell/base station supporting a slice requested by the first device and/or supported slice information, or a correspondence between slices and cells/base stations stored at the first device.

Optionally, the second device may be one of:
a source base station, a source AMF entity, an SMF entity, a UPF entity, a terminal device, and a specific network element for determining a slice admission status.

Optionally, the first device may be one of:
a target base station, a target AMF entity, an SMF entity, a UPF entity, and a specific network element for determining a slice admission status.

Optionally, when the first device is a target base station, the target network element is a target base station;
when the first device is a target AMF entity, the target network element is a target base station or the target AMF entity; or
when the first device is an SMF entity or a UPF entity or a specific network element for determining a slice admission status, the target network element is a target base station or a target AMF entity.

Optionally, in some embodiments, the above processing unit may be one or more processors.

It should be understood that the handover device 300 according to the embodiment of the present disclosure may correspond to the first device in the method embodiments of the present disclosure, and the above and other operations and/or functions of the respective units in the handover device 300 are provided to implement the respective processes performed by the first device in the method 200 shown in FIG. 2, and details thereof will be omitted here for brevity.

Figure 6:
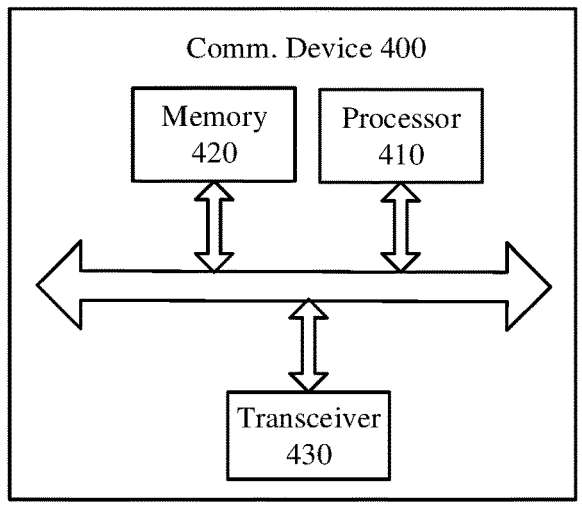
FIG. 6 is a schematic block diagram of a communication device according to an embodiment of the present disclosure.

FIG. 6 is a schematic diagram showing a structure of a communication device 400 according to an embodiment of the present disclosure. The communication device 400 shown in FIG. 6 includes a processor 410, and the processor 410 can invoke and execute a computer program from a memory to implement the method in the embodiment of the present disclosure.

Optionally, as shown in FIG. 6, the communication device 400 may further include a memory 420. The processor 410 can invoke and execute a computer program from the memory 420 to implement the method in the embodiment of the present disclosure.

The memory 420 may be a separate device independent from the processor 410, or may be integrated in the processor 410.

Optionally, as shown in FIG. 6, the communication device 400 may further include a transceiver 430, and the processor 410 may control the transceiver 430 to communicate with other devices, and in particular, transmit information or data to other devices, or receive information or data transmitted by other devices.

Here, the transceiver 430 may include a transmitter and a receiver. The transceiver 430 may further include one or more antennas.

Optionally, the communication device 400 may specifically be the first device according to the embodiment of the present disclosure, and the communication device 400 may implement the corresponding processes implemented by the first device in any of the methods according to the embodiments of the present disclosure. For the sake of brevity, details thereof will be omitted here.

Figure 7:
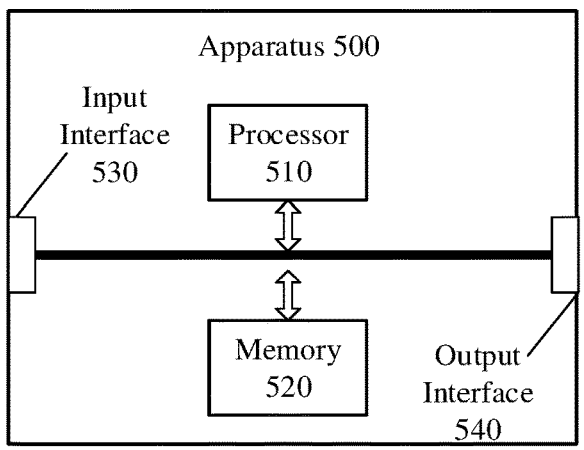
FIG. 7 is a schematic block diagram of an apparatus according to an embodiment of the present disclosure.

FIG. 7 is a schematic diagram showing a structure of an apparatus according to an embodiment of the present disclosure. The apparatus 500 shown in FIG. 7 includes a processor 510, and the processor 510 can invoke and execute a computer program from a memory to implement the method in the embodiment of the present disclosure.

Optionally, as shown in FIG. 7, the apparatus 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, the apparatus 500 may further include an input interface 530. The processor 510 can control the input interface 530 to communicate with other devices or chips, and in particular, obtain information or data transmitted by other devices or chips.

Optionally, the apparatus 500 may further include an output interface 540. The processor 510 can control the output interface 540 to communicate with other devices or chips, and in particular, output information or data to other devices or chips.

Optionally, the apparatus can be applied to the first device in the embodiment of the present disclosure, and the apparatus can implement the corresponding processes implemented by the first device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

Figure 8:
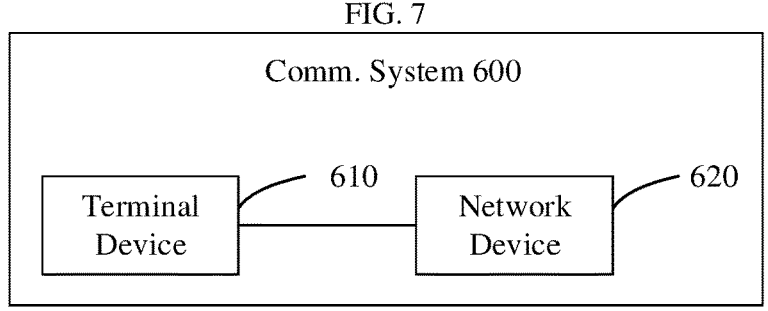
FIG. 8 is a schematic block diagram of a communication system according to an embodiment of the present disclosure.

FIG. 8 is a schematic block diagram showing a communication system 600 according to an embodiment of the present disclosure. As shown in FIG. 8, the communication system 600 includes a terminal device 610 and a network device 620.

Here, the network device 620 can be configured to implement the corresponding functions implemented by the first device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the first device in the embodiment of the present disclosure, and the computer program can cause a computer to perform corresponding procedures implemented by the first device in the method according to any of the embodiments of the present disclosure. Details thereof will be omitted here for simplicity.

An embodiment of the present disclosure also provides a computer program product including computer program instructions.

Optionally, the computer program product can be applied to the first device in the embodiment of the present disclosure, and the computer program instructions can cause a computer to perform corresponding procedures implemented by the first device in the method according to any of the embodiments of the present disclosure. Details thereof will be omitted here for simplicity.

An embodiment of the present disclosure also provides a computer program.

Optionally, the computer program can be applied to the first device in the embodiment of the present disclosure. The computer program, when executed on a computer, can cause the computer to perform corresponding procedures implemented by the first device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A handover method, comprising:
    determining, by a first device, a handover behavior based on target slice information, wherein
    the target slice information comprises information on a slice supported by a target network element, or information on a slice requested to be handed over and the information on a slice supported by the target network element, wherein the information on a slice supported by the target network element comprises a maximum uplink/downlink data rate for each user on at least one slice, and
    the handover behavior comprises: whether to perform handover and/or whether to perform slice remapping or slice fallback during a handover process,
    wherein said determining, by the first device, the handover behavior based on the target slice information comprises at least one of:
    determining, by the first device, not to perform handover when a Protocol Data Unit (PDU) session or slice requested to be handed over matches a first slice supported by the target network element, and an uplink/downlink data rate for each user of the target network element on the first slice has reached a maximum uplink/downlink data rate for each user on the first slice or would reach the maximum uplink/downlink data rate for each user on the first slice once the terminal device is admitted;

determining, by the first device, to perform handover and to perform slice remapping or slice fallback during the handover process when a PDU session or slice requested to be handed over matches a first slice supported by the target network element, an uplink/downlink data rate for each user of the target network element on the first slice has reached a maximum uplink/downlink data rate for each user on the first slice or would reach the maximum uplink/downlink data rate for each user on the first slice once the terminal device is admitted, and the target network element supports slice modification; or determining, by the first device, to perform handover when a PDU session or slice requested to be handed over matches a first slice supported by the target network element, an uplink/downlink data rate for each user of the target network element on the first slice has not reached a maximum uplink/downlink data rate for each user on the first slice or would not reach the maximum uplink/downlink data rate for each user on the first slice once the terminal device is admitted.

2. The method according to claim 1, wherein the information on the slice requested to be handed over comprises at least one of:

an identifier of a PDU session requested to be handed over, an identifier of a slice requested to be handed over, a priority of the PDU session requested to be handed over, a priority of the slice requested to be handed over, a continuity requirement of the PDU session requested to be handed over, a continuity requirement of the slice requested to be handed over.

3. The method according to claim 1, wherein the information on the slice supported by the target network element further comprises at least one of:

an identifier of a slice supported by the target network element, a maximum number of users supported by at least one slice, a maximum number of PDU sessions supported by at least one slice, a slicing capability supported by the target network element, whether the target network element supports slicing, and whether the target network element supports slice modification.

4. The method of claim 3, further comprising:

acquiring, by the first device, at least one of the maximum number of users supported by the at least one slice, the maximum number of PDU sessions supported by the at least one slice, and the maximum uplink/downlink data rate for each user on the at least one slice, from at least one of an Operation Administration and Maintenance (OAM) entity, a network slice management entity, a core network entity, and an access network entity.

5. The method according to claim 4, wherein the network slice management entity is a Network Slice Function (NSF) entity.

6. The method according to claim 4, wherein the core network entity comprises at least one of:

a Network Slice Function (NSF) entity, an Access and Mobility Management Function (AMF) entity, a Session Management Function (SMF) entity, or a User Plane Function (UPF) entity.

7. The method according to claim 4, wherein the access network entity is a base station.

8. The method according to claim 1, wherein said determining, by the first device, the handover behavior based on the target slice information further comprises:

determining, by the first device, not to perform handover when at least one of the following is satisfied: the target network element does not support slicing, the target network element does not support slice remapping, and the target network element does not support slice fallback.

9. The method according to claim 1, wherein said determining, by the first device, the handover behavior based on the target slice information further comprises at least one of:

determining, by the first device, not to perform handover when the slice supported by the target network element does not match the PDU session or slice requested to be handed over;

determining, by the first device, to perform handover and to perform slice remapping or slice fallback during the handover process when the slice supported by the target network element does not match the PDU session or slice requested to be handed over and the priority of the PDU session or slice requested to be handed over is higher than a predetermined value;

determining, by the first device, to perform handover and to perform slice remapping or slice fallback during the handover process when the slice supported by the target network element does not match the PDU session or slice requested to be handed over and the PDU session or slice requested to be handed over has the continuity requirement;

determining, by the first device, to perform handover and to perform slice remapping or slice fallback during the handover process when the slice supported by the target network element does not match the PDU session or slice requested to be handed over, the priority of the PDU session or slice requested to be handed over is higher than a predetermined value, and the target network element supports slice modification;

determining, by the first device, to perform handover and to perform slice remapping or slice fallback during the handover process when the slice supported by the target network element does not match the PDU session or slice requested to be handed over, the PDU session or slice requested to be handed over has the continuity requirement, and the target network element supports slice modification;

determining, by the first device, not to perform handover when the slice supported by the target network element does not match the PDU session or slice requested to be handed over, the priority of the PDU session or slice requested to be handed over is higher than a predetermined value, and the target network element does not support slice modification; and determining, by the first device, not to perform handover when the slice supported by the target network element does not match the PDU session or slice requested to be handed over, the PDU session or slice requested to be handed over has the continuity requirement, and the target network element does not support slice modification.

10. The method according to claim 1, wherein said determining, by the first device, the handover behavior based on the target slice information further comprises at least one of:

determining, by the first device, to perform handover when the slice supported by the target network element matches the PDU session or slice requested to be handed over;

determining, by the first device, not to perform handover when the PDU session or slice requested to be handed over matches the first slice supported by the target network element, and a number of users of the target network element on the first slice has reached a maximum number of users supported by the first slice;

determining, by the first device, to perform handover and to perform slice remapping or slice fallback during the handover process when the PDU session or slice requested to be switched matches the first slice supported by the target network element, a number of users of the target network element on the first slice has reached a maximum number of users supported by the first slice, and the target network element supports slice modification;

determining, by the first device, to perform handover when the PDU session or slice requested to be handed over matches the first slice supported by the target network element, and a number of users of the target network element on the first slice has not reached a maximum number of users supported by the first slice;

determining, by the first device, not to perform handover when the PDU session or slice requested to be handed over matches the first slice supported by the target network element, and a number of PDU sessions of the target network element on the first slice has reached a maximum number of PDU sessions supported by the first slice;

determining, by the first device, to perform handover and to perform slice remapping or slice fallback during the handover process when the PDU session or slice requested to be handed over matches the first slice supported by the target network element, a number of PDU sessions of the target network element on the first slice has reached a maximum number of PDU sessions supported by the first slice, and the target network element supports slice modification;

determining, by the first device, to perform handover when the PDU session or slice requested to be handed over matches the first slice supported by the target network element, and a number of PDU sessions of the target network element on the first slice has not reached a maximum number of PDU sessions supported by the first slice.

11. The method according to claim 1, wherein said determining, by the first device, the handover behavior based on the target slice information further comprises at least one of:

determining, by the first device, not to perform handover when the PDU session or slice requested to be handed over matches a plurality of slices supported by the target network element, and a number of users of the target network element on at least one of the plurality of slices reaches a maximum number of users supported by the at least one slice;

determining, by the first device, to perform handover when the PDU session or slice requested to be handed over matches a plurality of slices supported by the target network element, and a number of users of the target network element on each of the plurality of slices has not reached a maximum number of users supported by the slice;

determining, by the first device, to perform handover when the PDU session or slice requested to be handed over matches a plurality of slices supported by the target network element, and a number of users of the target network element on at least one of the plurality of slices has not reached a maximum number of users supported by the at lease on slice;

determining, by the first device, not to perform handover when the PDU session or slice requested to be handed over matches a plurality of slices supported by the target network element, and a number of PDU sessions of the target network element on at least one of the plurality of slices has reached a maximum number of PDU sessions supported by the at least one slice;

determining, by the first device, to perform handover when the PDU session or slice requested to be handed over matches a plurality of slices supported by the target network element, and a number of PDU sessions of the target network element on each of the plurality of slices has not reached a maximum number of PDU sessions supported by the slice;

determining, by the first device, to perform handover when the PDU session or slice requested to be handed over matches a plurality of slices supported by the target network element, and a number of PDU sessions of the target network element on at least one of the plurality of slices has not reached a maximum number of PDU sessions supported by the at least one slice;

determining, by the first device, not to perform handover when the PDU session or slice requested to be handed over matches a plurality of slices supported by the target network element, and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted;

determining, by the first device, to perform handover when the PDU session or slice requested to be switched matches a plurality of slices supported by the target network element, and an uplink/downlink data rate for each user of the target network element on each of the plurality of slices has not reached a maximum uplink/downlink data rate for each user on the slice or would not reach the maximum uplink/downlink data rate for each user on the slice once the terminal device is admitted; and determining, by the first device, to perform handover when the PDU session or slice requested to be switched matches a plurality of slices supported by the target network element, and an uplink/downlink data rate for each user of the target network element on at least one of the plurality of slices has not reached a maximum uplink/downlink data rate for each user on the at least one slice or would not reach the maximum uplink/downlink data rate for each user on the at least one slice once the terminal device is admitted.

12. The method according to claim 1, wherein said determining, by the first device, the handover behavior based on the target slice information further comprises at least one of:

determining, by the first device when the PDU session or slice requested to be handed over matches a plurality of slices supported by the target network element and a number of users of the target network element on at least one of the plurality of slices has reached a maximum number of users supported by the at least one slice, to perform handover and determining that the at least one slice is rejected or determining to perform slice remapping or slice fallback during the handover process;

determining, by the first device when the PDU session or slice requested to be handed over matches a plurality of slices supported by the target network element and a number of PDU sessions of the target network element on at least one of the plurality of slices has reached a maximum number of PDU sessions supported by the at least one slice, to perform handover and determining that the at least one slice is rejected or determining to perform slice remapping or slice fallback during the handover process;

determining, by the first device when the PDU session or slice requested to be handed over matches a plurality of slices supported by the target network element and an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, to perform handover and determining that the at least one slice is rejected or determining to perform slice remapping or slice fallback during the handover process;

determining, by the first device when the PDU session or slice requested to be handed over matches a plurality of slices supported by the target network element, a number of users of the target network element on at least one of the plurality of slices has reached a maximum number of users supported by the at least one slice, and the target network element supports slice modification, to perform handover and determining that the at least one slice is rejected or determining to perform slice remapping or slice fallback during the handover process;

determining, by the first device when the PDU session or slice requested to be handed over matches a plurality of slices supported by the target network element, a number of PDU sessions of the target network element on at least one of the plurality of slices has reached a maximum number of PDU sessions supported by the at least one slice, and the target network element supports slice modification, to perform handover and determining that the at least one slice is rejected or determining to perform slice remapping or slice fallback during the handover process; and determining, by the first device when the PDU session or slice requested to be handed over matches a plurality of slices supported by the target network element, an uplink/downlink data rate for each user of the target network element on at least one of the plurality of slices has reached a maximum uplink/downlink data rate for each user on the at least one slice or would reach the maximum uplink/downlink data rate for each user on the at least one slice once the terminal device is admitted, and the target network element supports slice modification, to perform handover and determining that the at least one slice is rejected or determining to perform slice remapping or slice fallback during the handover process.

13. The method according to claim 1, further comprising:
recommending, by the first device when the first device determines not to perform handover, to a second device: a selectable handover cell or base station, slice information supported by the first device, a cell/base station supporting a slice requested by the first device and/or supported slice information, or a correspondence between slices and cells/base stations stored at the first device; or recommending, by the first device when the first device determines that it does not support slicing, does not support the requested slice, or does not support the requested PDU session, to a second device: a selectable handover cell or base station, slice information supported by the first device, a cell/base station supporting a slice requested by the first device and/or supported slice information, or a correspondence between slices and cells/base stations stored at the first device.

14. The method according to claim 1, further comprising:
recommending, by the first device when the first device determines not to perform handover and the priority of the PDU session or slice requested to be handed over is higher than a predetermined value, to a second device: a selectable handover cell or base station, slice information supported by the first device, a cell/base station supporting a slice requested by the first device and/or supported slice information, or a correspondence between slices and cells/base stations stored at the first device;

recommending, by the first device when the first device determines not to perform handover and the PDU session or slice requested to be handed over has the continuity requirement, to a second device: a selectable handover cell or base station, slice information supported by the first device, a cell/base station supporting a slice requested by the first device and/or supported slice information, or a correspondence between slices and cells/base stations stored at the first device;

recommending, by the first device when the first device determines that it does not support slicing, does not support the requested slice, does not support the requested PDU session, does not support slice modification, or does not support PDU session modification corresponding to the slice, and the priority of the PDU session or slice requested to be handed over is higher than a predetermined value, to a second device: a selectable handover cell or base station, slice information supported by the first device, a cell/base station supporting a slice requested by the first device and/or supported slice information, or a correspondence between slices and cells/base stations stored at the first device; or recommending, by the first device when the first device determines that it does not support slicing, does not support the requested slice, does not support the requested PDU session, does not support slice modification, or does not support PDU session modification corresponding to the slice, and the PDU session or slice requested to be handed over has the continuity requirement, to a second device: a selectable handover cell or base station, slice information supported by the first device, a cell/base station supporting a slice requested by the first device and/or supported slice information, or a correspondence between slices and cells/base stations stored at the first device.

15. The method according to claim 13, wherein the second device is one of:
a source base station, a source AMF entity, an SMF entity, a UPF entity, a terminal device, and a specific network element for determining a slice admission status.

16. The method according to claim 14, wherein the second device is one of:
a source base station, a source AMF entity, an SMF entity, a UPF entity, a terminal device, and a specific network element for determining a slice admission status.

17. The method according to claim 1, wherein the first device is one of:

a target base station, a target AMF entity, an SMF entity, a UPF entity, and a specific network element for determining a slice admission status.

18. The method according to claim 1, wherein:
when the first device is a target base station, the target network element is a target base station;
when the first device is a target AMF entity, the target network element is a target base station or the target AMF entity; or
when the first device is an SMF entity or a UPF entity or a specific network element for determining a slice admission status, the target network element is a target base station or a target AMF entity.

19. A handover device, comprising a processor and a memory, wherein the memory is configured to store a computer program, and the processor is configured to invoke and execute the computer program stored in the memory to cause the handover device to:
determine a handover behavior based on target slice information, wherein the target slice information comprises information on a slice supported by a target network element, or information on a slice requested to be handed over and the information on a slice supported by the target network element, wherein the information on a slice supported by the target network element comprises a maximum uplink/downlink data rate for each user on at least one slice, and
the handover behavior comprises: whether to perform handover and/or whether to perform slice remapping or slice fallback during a handover process,
wherein said determining, by the first device, the handover behavior based on the target slice information comprises at least one of:
determining, by the first device, not to perform handover when a Protocol Data Unit (PDU) session or slice requested to be handed over matches a first slice supported by the target network element, and an uplink/downlink data rate for each user of the target network element on the first slice has reached a maximum uplink/downlink data rate for each user on the first slice or would reach the maximum uplink/downlink data rate for each user on the first slice once the terminal device is admitted;
determining, by the first device, to perform handover and to perform slice remapping or slice fallback during the handover process when a PDU session or slice requested to be handed over matches a first slice supported by the target network element, an uplink/downlink data rate for each user of the target network element on the first slice has reached a maximum uplink/downlink data rate for each user on the first slice or would reach the maximum uplink/downlink data rate for each user on the first slice once the terminal device is admitted, and the target network element supports slice modification; or
determining, by the first device, to perform handover when a PDU session or slice requested to be handed over matches a first slice supported by the target network element, an uplink/downlink data rate for each user of the target network element on the first slice has not reached a maximum uplink/downlink data rate for each user on the first slice or would not reach the maximum uplink/downlink data rate for each user on the first slice once the terminal device is admitted.

20. A chip, comprising a processor configured to invoke and execute a computer program from a memory, to enable a device provided with the chip to:
determine a handover behavior based on target slice information, wherein
the target slice information comprises information on a slice supported by a target network element, or information on a slice requested to be handed over and the information on a slice supported by the target network element, wherein the information on a slice supported by the target network element comprises a maximum uplink/downlink data rate for each user on at least one slice, and
the handover behavior comprises: whether to perform handover and/or whether to perform slice remapping or slice fallback during a handover process,
wherein said determining, by the first device, the handover behavior based on the target slice information comprises at least one of:
determining, by the first device, not to perform handover when a Protocol Data Unit (PDU) session or slice requested to be handed over matches a first slice supported by the target network element, and an uplink/downlink data rate for each user of the target network element on the first slice has reached a maximum uplink/downlink data rate for each user on the first slice or would reach the maximum uplink/downlink data rate for each user on the first slice once the terminal device is admitted;
determining, by the first device, to perform handover and to perform slice remapping or slice fallback during the handover process when a PDU session or slice requested to be handed over matches a first slice supported by the target network element, an uplink/downlink data rate for each user of the target network element on the first slice has reached a maximum uplink/downlink data rate for each user on the first slice or would reach the maximum uplink/downlink data rate for each user on the first slice once the terminal device is admitted, and the target network element supports slice modification; or
determining, by the first device, to perform handover when a PDU session or slice requested to be handed over matches a first slice supported by the target network element, an uplink/downlink data rate for each user of the target network element on the first slice has not reached a maximum uplink/downlink data rate for each user on the first slice or would not reach the maximum uplink/downlink data rate for each user on the first slice once the terminal device is admitted.

* * * * *